United States Patent [19]

Tada et al.

[11] Patent Number: 4,907,459

[45] Date of Patent: Mar. 13, 1990

[54] VORTEX FLOW METER

[75] Inventors: Yasuo Tada; Akinori Akazawa, both of Hyogo, Japan

[73] Assignee: Mitsubishi Denki Kabushiki Kaisha, Tokyo, Japan

[21] Appl. No.: 321,242

[22] Filed: Mar. 9, 1989

[30] Foreign Application Priority Data

Mar. 15, 1988 [JP] Japan .................................. 63-34781
Oct. 6, 1988 [JP] Japan .................................. 63-131086

[51] Int. Cl.$^4$ .............................................. G01F 1/32
[52] U.S. Cl. .................................................. 73/861.24
[58] Field of Search ....................... 73/861.22, 861.24

[56] References Cited

U.S. PATENT DOCUMENTS 3,991,613 11/1976 Adler et al. ..................... 73/861.22
4,161,878 7/1979 Fussell, Jr. ..................... 73/861.24

FOREIGN PATENT DOCUMENTS 54-3725 2/1979 Japan .
60-100026 6/1985 Japan .
61-4808 2/1986 Japan .

Primary Examiner—Herbert Goldstein
Attorney, Agent, or Firm—Sughrue, Mion, Zinn, Macpeak & Seas

[57] ABSTRACT

A vortex flow meter comprises a first diaphragm which divides a first and a second pressure chamber from each other; a second diaphragm which divides a third and a fourth pressure chambers from each other; a first and a second bridge circuits which receive the action of the first and the second diaphragms, respectively; a first and a second variable amplifiers which amplify the outputs from the first and the second bridge circuits, respectively; and a differential amplifier which receives the outputs made by the first and the second variable amplifiers, inverse to each other in polarity and nearly equal to each other in magnitude.

4 Claims, 5 Drawing Sheets

VORTEX FLOW METER

BACKGROUND OF THE INVENTION

1. Field of the Invention

The present device relates to a vortex flow meter in which two diaphragms cumulatively act for a signal output but differentially act against a noise to make the difference between noise outputs zero.

2. Prior Art

There are various kinds of vortex pressure detection systems. The Japanese Patent Application No. 36776/75 or the Japanese Utility Model Application No. 3725/79 disclosed a flow meter in which the pressure of vortices is transmited to a right and a left chambers divided from each other by a diaphragm to detect the difference in the pressure.

In a conventional flow meter of such kind, the sensitivity of a diaphragm needs to be made very high to detect the pressure of vortices in a range of very low flow rate. However, if the sensitivity is made very high, the diaphragm responds not only to the pressure of the vortices but also to an external force such as a vibratory force. This is a problem.

SUMMARY OF THE INVENTION

The present device was made in order to solve the problem.

Accordingly, it is an object of the present device to provide a vortex flow meter which can measure a very low flow rate with very small vortex pressure and is high in resistance to external vibration.

The vortex flow meter according to the present invention comprises a first diaphragm which divides a first and a second pressure chambers from each other; a second diaphragm which divides a third and a fourth pressure chambers from each other; a first and a second bridge circuits which receive the action of the first and the second diaphragms, respectively; a first and a second variable amplifiers which amplify the outputs from the first and the second bridge circuits, respectively; and a differential amplifier which receives the outputs made by the first and the second variable amplifiers, inverse to each other in polarity and nearly equal to each other in magnitude.

In the vortex flow meter provided in accordance with the present device, the changes in the pressure of Kárman vortices are transmitted to the first, the second, the third and the fourth pressure chambers. The pressure difference between the first and the second pressure chambers and that between the third and the fourth pressure chambers are detected by the first and the second diaphragms, respectively. The first and the second bridge circuits make outputs from the action of the first and the second diaphragms, respectively. The first and the second variable amplifiers amplify the outputs from the first and the second bridge circuits, respectively. The amplification factors of the first and the second variable amplifiers are adjusted so that outputs made by the amplifiers in response to an external force such as a vibratory force and acting to the first and the second diaphragms are equalized to each other. The differential amplifier performs the differential amplification of the outputs from the first and the second variable amplifiers.

Further, the vortex flow meter according to the present device comprises a first and a second pressure takeout ports opened downstream to both the sides of a vortex generator in a conduit through which a fluid to be measured flows; a first pressure passage through which the first pressure takeout port communicates with a first and a fourth pressure chambers; a second pressure passage through which the second pressure takeout port communicates with a second and a third pressure chambers; a first diaphragm which divides the first and the second pressure chambers from each other; a second diaphragm which divides the third and the fourth pressure chambers from each other; a first and a second bridge circuits which make outputs in response to the action of the first and the second diaphragms, respectively; and a variable differential amplifier which performs the differential amplification of the inputs supplied thereto on the basis of the outputs from the first and the second bridge circuits and has gain control resistors for performing gain control to equalize the inputs to each other even if a force except the pressure of vortices acts to the diaphragms.

In the vortex flow meter provided in accordance with the present device, the pressure of vortices downstream to both the sides of the vortex generator in the conduit is transmitted to the pressure chambers through the pressure takeout ports and the pressure passages so that the first and the second diaphragms act in mutually reverse directions. As a result, the first and the second bridge circuits produces the outputs inverse to each other in polarity so that the inputs supplied to the variable differential amplifier on the basis of the outputs from the first and the second bridge circuits are cumulatively processed by the variable differential amplifier. When the external force except the pressure of the vortices acts to the diaphragms, the outputs from the first and the second bridge circuits change in the same direction of increase or decrease at the same time so that the action of the external force is cancelled by the variable differential amplifier. If the outputs from the first and the second bridge circuits are not equal to each other, the gain control is performed by the gain control resistors to equalize the outputs to each other.

DETAILED DESCRIPTION OF THE PREFERRED EMBODIMENTS

Embodiments of the present device will be described with reference to the drawings attached hereto.

Figure 1:
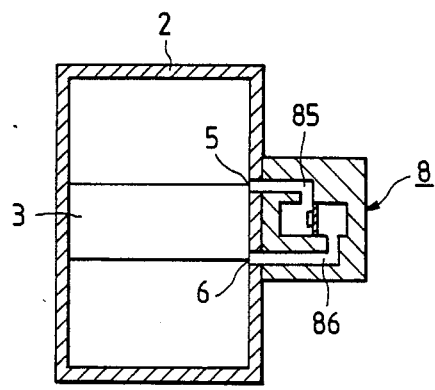
FIGS. 1 and 2 show mutually-perpendicular sectional views of a vortex flow meter according to an embodiment of the present device.
Figure 2:
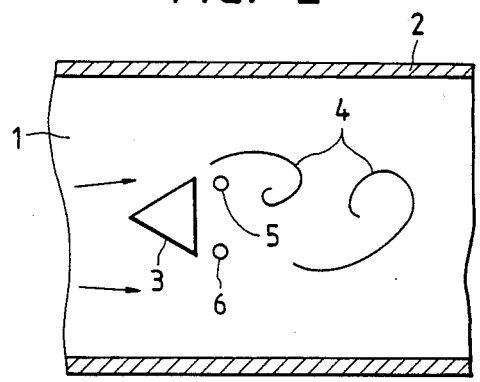
Figure 3:
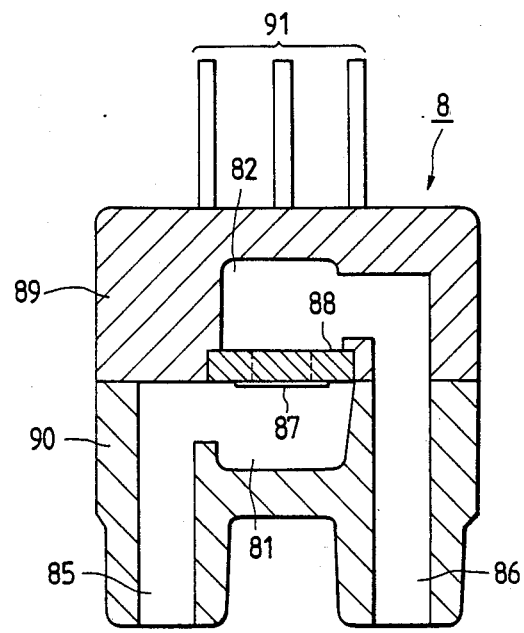
FIGS. 3 and 4 show mutually-perpendicular sectional views of the vortex pressure detector of the vortex flow meter.
Figure 4:
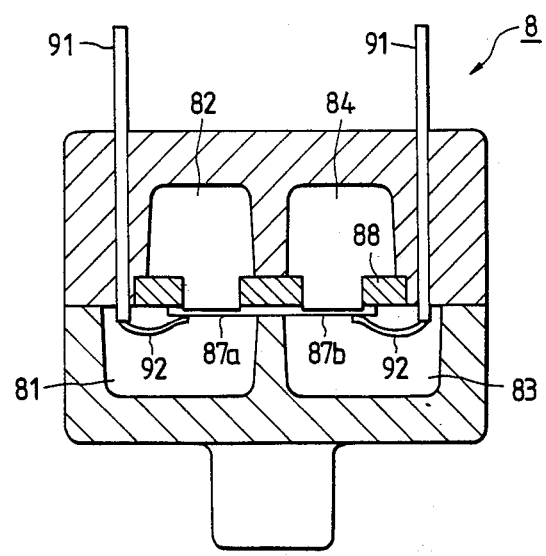
Figure 5:
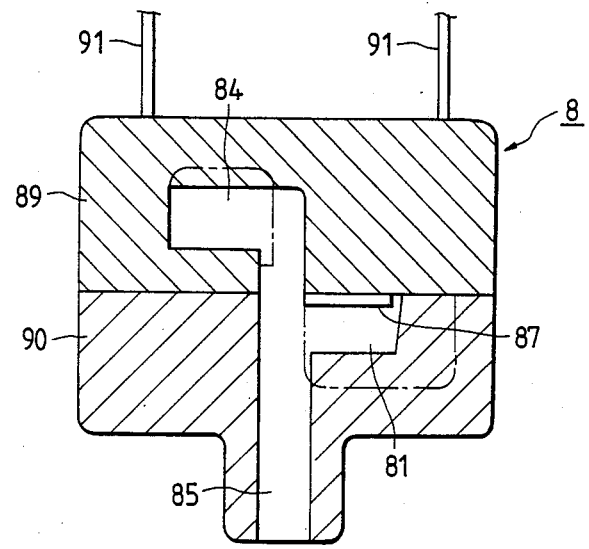
FIGS. 5 and 6 show mutually-different sectional views of the vortex pressure detector.
Figure 6:
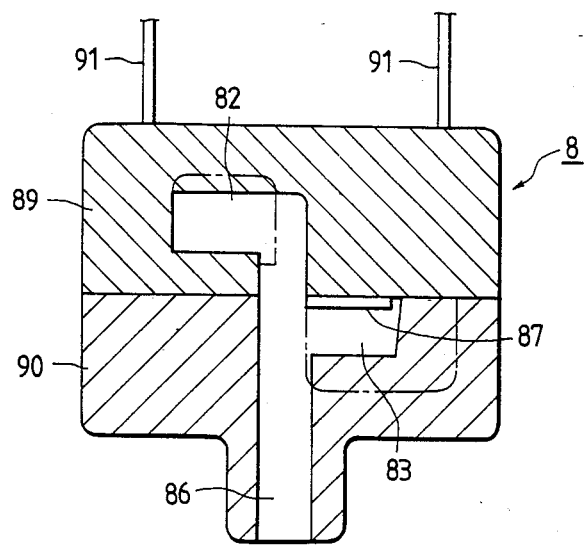

FIGS. 1 and 2 show mutually-perpendicular sectional views of a vortex flow meter which is the embodiment. A measured fluid 1 such as intake air flows through a conduit 2 in the flow meter. A vortex generator 3 is provided in the conduit 2 and extends perpendicularly to the direction of the flow of the fluid 1. Kárman vortices 4 are generated in the fluid 1 downstream to the vortex generator 3. A first and a second pressure takeout ports 5 and 6 are provided in the wall of the conduit 2 downstream to the vortex generator 3 to detect the pressure of the Kárman vortices 4. A vortex pressure detector 8 communicates with the pressure takeout ports 5 and 6, and is provided outside the conduit 2. The body of the detector 8 is made of casing members 89 and 90 integrally coupled with each other, as shown in FIGS. 3 and 4. A first and a second pressure passages 85 and 86 are provided in the casing member 90 and communicate with the pressure takeout ports 5 and 6, respectively. A first and a third pressure chambers 81 and 83 are provided in the casing member 90. A second and a fourth pressure chambers 82 and 84 are provided in the other casing member 89. As shown in FIGS. 5 and 6, the first and the fourth pressure chambers 81 and 84 communicate with the first pressure passage 85, and the second and the third pressure chambers 82 and 83 communicate with the second pressure passage 86. A base plate 88 fitted with a semiconductor chip 87 is provided between the casing members 89 and 90. The semiconductor chip 87 has a first and a second diaphragms 87a and 87b. The first diaphragm 87a divides the first and the second pressure chambers 81 and 82 from each other. The second diaphragm 87b divides the third and the fourth pressure chambers 83 and 84 from each other. Semiconductor bridge circuits 101 and 102 are provided on the first and the second diaphragms 87a and 87b, respectively. The terminals of the bridge circuits 101 and 102 are connected to an external circuit through wires 92 and terminals 91.

Figure 7:
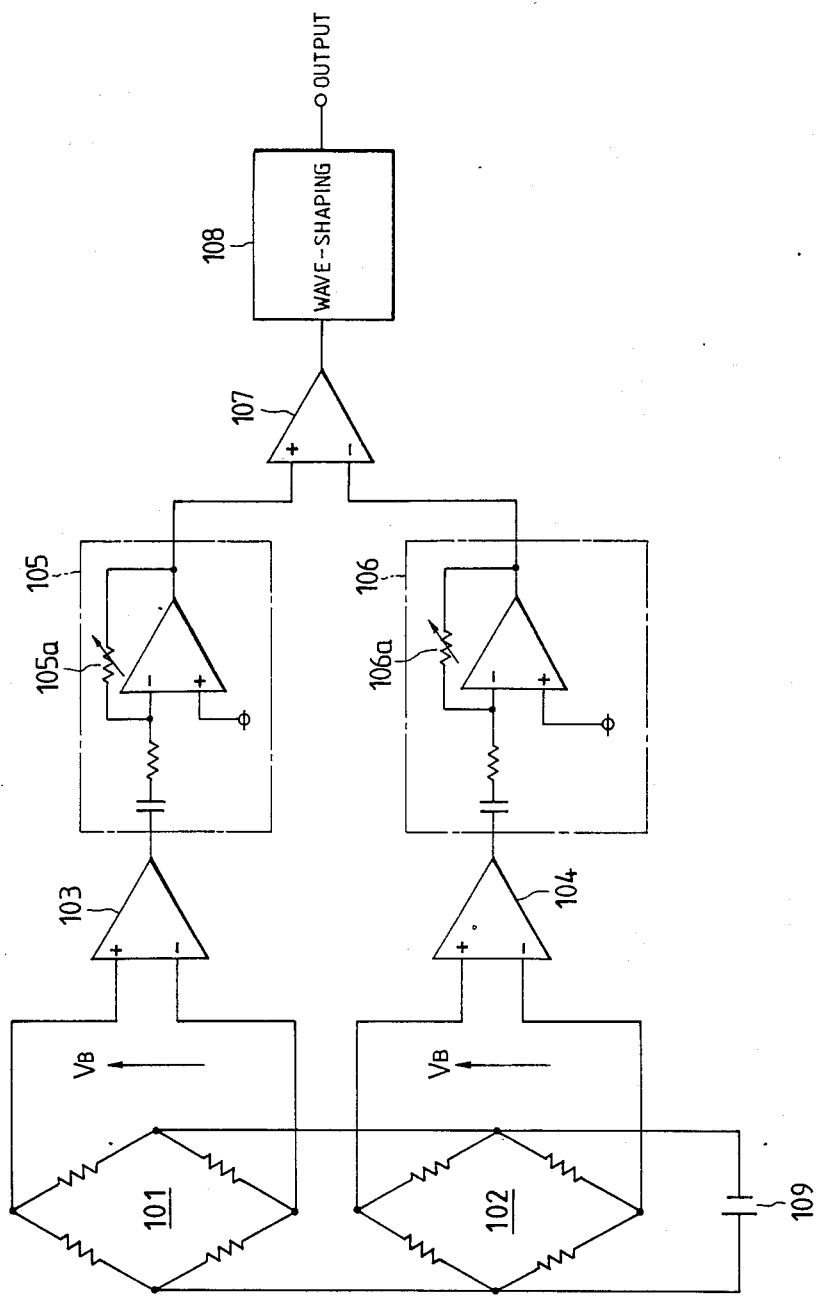
FIG. 7 shows a wiring diagram of the vortex flow meter according to another embodiment of the present invention.

FIG. 7 shows a wiring diagram of the control section of the vortex flow meter according to one embodiment of the present invention. The control section includes the first and the second bridge circuits 101 and 102 each composed of four piezoelectric resistors. A first and a second differential amplifiers 103 and 104 receive the outputs from the first and the second bridge circuits 101 and 102, respectively. A first variable amplifier 105 regulates the output from the first differential amplifier 103. A second variable amplifier 106 regulates the output from the second differential amplifier 104. Gain control resistors 105a and 106a are provided in the first and the second variable amplifiers 105 and 106, respectively. A third differential amplifier 107 receives the outputs from the first and the second variable amplifiers 105 and 106. A wave-shaping circuit 108 receives the output from the third differential amplifier 107. A power supply 109 is provided for the first and the second bridge circuits 101 and 102.

The operation of the vortex flow meter is described in detail from now on. When the fluid 1 flows through the conduit 2, the clockwise and counterclockwise vortices 4 are alternately generated downstream to the vortex generator 3, as shown in FIG. 2. The vortices 4 are generally called the Kárman trail. The generation of the vortices 4 is accompanied by pressure changes. For that reason, pressure changes take place on the inside surface of the conduit 2 along the passage for the Kárman vortices 4. Because of the alternate generation of the clockwise and counterclockwise vortices 4, pressure changes alternately take place at the pressure takeout ports 5 and 6 opened into the conduit 2 in the face of the passage for the vortices. The pressure of the vortices 4 is negative in general. When the clockwise vortex 4 is generated at the pressure takeout port port 5, negative pressure is caused at the port and is transmitted to the first and the fourth pressure chambers 81 and 84 through the pressure passage 85 so that the first and the second diaphragms 87a and 87b are deformed toward the first and the fourth pressure chambers 81 and 84, respectively. When the counterclockwise vortex 4 is generated at the other pressure takeout port 6, negative pressure is caused at the port and is transmitted to the second and the third pressure chambers 82 and 83 through the pressure passage 86 so that the first and the second diaphragms 87a and 87b are deformed toward the second and the third pressure chambers 82 and 83, respectively.

It is herein supposed that when the first and the second diaphragms 87a and 87b are deformed toward the first and the third pressure chambers 81 and 83, respectively, the outputs from the bridge circuits 101 and 102 have such polarity as shown by arrows $v_B$ in FIG. 7. For that reason, at the time of the generation of the clockwise vortex 4, the bridge circuit 101 makes the output $+v_{B101}$ and the other bridge circuit 102 makes the output $-v_{B102}$. At the time of the generation of the counterclockwise vortex 4, the bridge circuit 101 makes the output $-v_{B101}$ and the other bridge circuit 102 makes the output $+v_{B102}$.

The input $V_{B105}$ to the plus input terminal of the third differential amplifier 107 and that $V_{B106}$ to the minus input terminal of the amplifier are expressed as follows:

$$V_{B105} = \alpha_{103} \times \beta_{105} \times v_{B101} \quad (1)$$

$$V_{B106} = \alpha_{104} \times \beta_{106} \times v_{B102} \quad (2)$$

In the equations (1) and (2), $\alpha_{103}$, $\alpha_{104}$, $\beta_{105}$ and $\beta_{106}$ denote the amplification factors of the first differential amplifier 103, the second differential amplifier 104, the first variable amplifier 105 and the second variable amplifier 106, respectively. Since the inputs $V_{B105}$ and $V_{B106}$ to the plus and minus input terminals of the third differential amplifier 107 are inverse to each other in polarity, the output $V_{B107}$ from the amplifier is expressed as follows:

$$V_{B107} = (\pm V_{B105}) - (\mp V_{B106}) \quad (3)$$

Therefore, the first and the second diaphragms 87a and 87b cumulatively act so that lower vortex pressure can be detected. The absolute values of the input voltages $V_{B105}$ and $V_{B106}$ do not need to be equal to each other.

The operation of the vortex flow meter in the case that external pressure except the pressure of the vortices 4 acts to the first and the second diaphragms 87a and 87b is now described. For example, the external pressure is the pressure which fluctuates in a pulsation which takes place in the conduit 2 due to the change in the flow of the fluid 1. Since the pulsation propagates throughout a relatively large length to the location of the vortex generator 3 from upstream or downstream thereto, the pulsation is a kind of a completely plane traveling wave in the conduit 2. For that reason, pressure changes of the same quantity simultaneously take place at the pressure takeout ports 5 and 6 and are transmitted to the first and the fourth pressure chambers 81 and 84 through the pressure passage 85 and to the second and the third pressure chambers 82 and 83 through the pressure passage 86, respectively. When the pressure changes of the same quantity are transmitted to the first and the second pressure chambers 81 and 82 divided from each other by the first diaphragm 87a, the diaphragm is not deformed toward any of the chambers, so that the first bridge circuit 101 does not make any output from the pressure changes. As a result, the control section of the vortex flow meter does not make any output from the pressure changes. When the pressure changes of the same quantity are transmitted to the third and the fourth pressure chambers 83 and 84 divided from each other by the second diaphragm 87b, the diaphragm is not deformed toward any of the chambers, so that the second bridge circuit 102 does not make any output from the pressure changes. As a result, the control section of the vortex flow meter does not make any output from the pressure changes.

The operation of the vortex flow meter in the case that the vortex pressure detector 8 is vibrated is now described. When the detector 8 is vibrated in such a direction that the first and the second diaphragms 87a and 87b are underformable, the diaphragms are not deformed by the vibration, so that the control section of the vortex flow meter does not make any output from the vibration. When the detector 8 is vibrated in such a direction that the diaphragms 87a and 87b are deformable, the diaphragms are deformed in the same direction as each other so that the first and the second bridge circuits 101 and 102 make the outputs $v_{B101}$ and $v_{B102}$. Since the amplification factors of the first and the second differential amplifiers 103 and 104 and the first and the second variable amplifiers 105 and 106 are as mentioned above, the output $V_{B107}$ from the third differential amplifier 107 at the time of the deformation of the diaphragms 87a and 87b is expressed as follows:

$$V_{B107} = (\pm V_{B105}) - (\pm V_{B106}) \quad (4)$$

If the inputs $V_{B105}$ and $V_{B106}$ to the plus and minus input terminals of the third differential amplifier 107 are equal to each other, the output $V_{B107}$ therefrom is zero, namely, the amplifier does not make any output from the vibration, so that a noise is not caused in the signal output from the amplifier, by the vibration.

However, the first and the second diaphragms 87a and 87b cannot be completely equalized to each other in dimensions, form and piezoelectric constant, in manufacturing them. For that reason, an inequality exists as follows:

$$v_{B101} \neq v_{B102} \text{ (however, } v_{B101} \approx v_{B102}\text{)}$$

The amplification factors of the first and the second differential amplifiers 103 and 104 cannot be equalized to each other, either. Nevertheless, the inputs $V_{B105}$ and $V_{B106}$ to the third differential amplifier 107 can be equalized to each other by adjusting the amplification factors of the first and the second variable amplifiers 105 and 106. For that purpose, the amplification factors of the variable amplifiers 105 and 106 are preset to establish an equation as follows:

$$\frac{\beta_{106}}{\beta_{105}} = \frac{\alpha_{104} \times v_{B102}}{\alpha_{103} \times v_{B101}}$$

For the presetting, the vortex pressure detector 8 is vibrated by a prescribed force and the control resistors 105a and 106a of the first and the second variable amplifiers 105 and 106 are trimmed so that the inputs to the plus and minus input terminals of the third differential amplifier 107 are equalized to each other.

Figure 8:
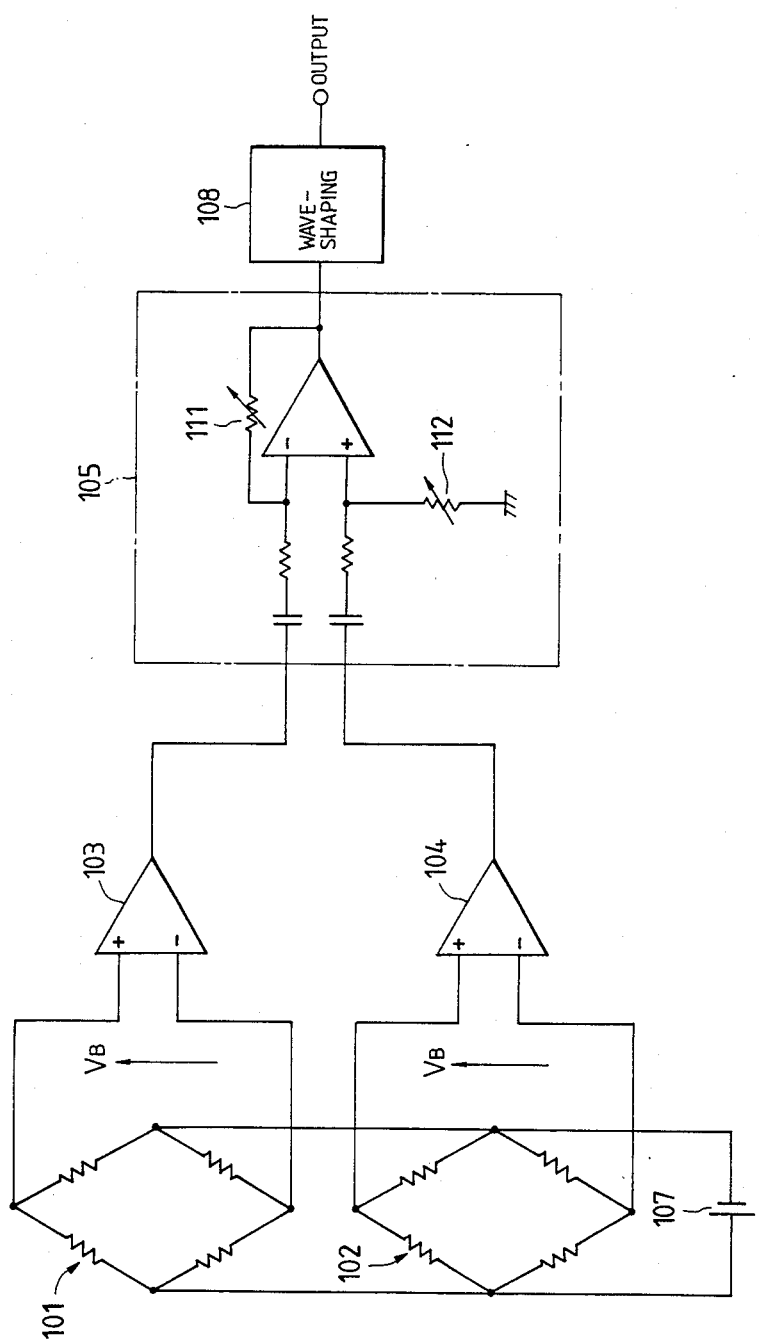
FIG. 8 shows a wiring diagram of the vortex flow meter according to a further embodiment of the present invention.

FIG. 8 shows a wiring diagram of the vortex flow meter according to the other embodiment of the present invention. Each of the first and the second bridge circuits 101 and 102 is composed of four piezoelectric resistors. A first and a second differential amplifiers 103 and 104 receive the outputs from the first and the second bridge circuits 101 and 102, respectively. A variable differential amplifier 105 receives the outputs from the first and the second differential amplifiers 103 and 104, respectively, and has gain control resistors 111 and 112. A wave-shaping circuit 108 receives the output from the variable differential amplifier 105. A power supply 107 is provided for the first and the second bridge circuits 101 and 102.

The operation of the vortex flow meter is described in detail from now on. When the fluid 1 flows through the conduit 2, the clockwise and counterclockwise vortices 4 are alternately generated downstream to the vortex generator 3 as shown in FIG. 2. The vortices 4 are generally called the Kármán trail. Because of the generation of the Kármán vortices 4, pressure changes are caused in the fluid 1. Therefore, pressure changes are also caused on the inside surface of the conduit 2 along the flow of the fluid 1. Thus, pressure changes alternately take place at the pressure takeout ports 5 and 6 facing the flow of the fluid 1. The pressure of the vortices 4 is negative in general. When the clockwise vortex 4 is generated at the pressure takeout port 5, negative pressure is caused at the port and is transmitted to the first and the fourth pressure chambers 81 and 84 through the pressure passage 85 so that the first diaphragm 87a is deformed toward the first pressure chamber and the second diaphragm 87b is deformed toward the fourth pressure chamber. When the counterclockwise vortex 4 is generated at the pressure takeout port 6, negative pressure is caused at the port and is transmitted to the second and the third pressure chambers 82 and 83 through the pressure passage 86 so that the first diaphragm 87a is deformed toward the second pressure chamber and the second diaphragm 87b is deformed toward the third pressure chamber.

It is herein supposed that when the first diaphragm 87a is deformed toward the first pressure chamber 81 and the second diaphragm 87b is deformed toward the third pressure chamber 83, the outputs from the first and the second bridge circuits 101 and 102 have such polarity as shown by arrows $V_B$ in FIG. 7. For that reason, at the time of the generation of the clockwise vortex 4, the first and the second bridge circuits 101 and 102 make the outputs $+V_{B101}$ and $-V_{B102}$, respectively. At the time of the generation of the counterclockwise vortex 4, the first and the second bridge circuits 101 and 102 make the outputs $-V_{B101}$ and $+V_{B102}$, respectively. The input $V_{B103}$ to the plus input terminal of the variable differential amplifier 105 and that $V_{B104}$ to the minus input terminal thereof are expressed as follows:

$$V_{B103} = \alpha_{103} \times V_{B101} \quad (5)$$

$$V_{B104} = \alpha_{104} \times V_{B102} \quad (6)$$

In the equations (5) and (6), $\alpha_{103}$ and $\alpha_{104}$ denote the amplification factors of the differential amplifiers 103 and 104, respectively. Since the inputs $V_{B103}$ and $V_{104}$ to the plus and minus input terminals of the variable differential amplifier 105 are inverse to each other in polarity, the output therefrom is expressed as follows:

$$V_{B105} = (\pm V_{B104}) - (\mp V_{B103}) \quad (7)$$

Therefore, the outputs made by the first and the second differential amplifiers 103 and 104 in response to the deformation of the first and the second diaphraqms 87a and 87b act cumulatively so that very small vortex pressure can be detected. The absolute values of the inputs $V_{B103}$ and $V_{B104}$ do not need to be equal to each other.

The operation of the vortex flow meter in the case that external pressure except the pressure of the vortices 4 acts to the first and the second diaphragms 87a and 87b is now described. For example, the external pressure is the pressure which fluctuates in a pulsation which takes place due to the change in the flow of the fluid 1. Since the pulsation propagates throughout a relatively large length to the location of the vortex generator 3 from upstream or downstream thereto, the pulsation is a kind of a completely plane traveling wave in the conduit 2. For that reason, pressure changes of the same quantity simultaneously take place at the pressure takeout ports 5 and 6 and are transmitted to the first, the second, the third and the fourth pressure chambers 81, 82, 83 and 84 through the pressure passages 85 and 86. When the first and the second pressure chambers 81 and 82 divided from each other by the first diaphragm 87a receive the pressure changes of the same quantity at the same time, the diaphragm is not deformed toward any of the pressure chambers, so that the first and the second bridge circuits 101 and 102 do not make any output from the pressure changes. As a result, the vortex flow meter does not make any output from the pressure changes. When the third and the fourth pressure chambers 83 and 84 divided from each other by the second diaphragm 87b receive the pressure changes of the same quantity at the same time, the diaphragm is not deformed toward any of the pressure chambers, so that the first and the second bridge circuits 101 and 102 do not make any output from the pressure changes. As a result, the vortex flow meter does not make any output from the pressure changes.

The operation of the vortex flow meter in the case that the vortex pressure detector 8 is vibrated is now described. When the detector 8 is vibrated in such a direction that the first and the second diaphragms 87a and 87b are undeformable, the diaphragms are not deformed by the vibration, so that the vortex flow meter does not make any output from the vibration. When the detector 8 is vibrated in such a direction that the first and the second diaphragms 87a and 87b are deformable, the diaphragms are deformed in the same direction as each other by the vibration so that the first and the second bridge circuits 101 and 102 make the outputs $V_{B101}$ and $V_{B102}$, respectively. Since the amplification factors of the first and the second differential amplifiers 103 and 104 are as mentioned above, the output $V_{B105}$ from the variable differential amplifier 105 is expressed as follows:

$$V_{B105} = (\pm V_{B104}) - (\pm V_{B103}) \tag{8}$$

If the inputs $V_{B103}$ and $V_{B104}$ to the plus and minus input terminals of the variable differential amplifier 105 are equal to each other, the output $V_{B105}$ therefrom is zero so that the vortex flow meter does not make any output from the vibration. Therefore, no noise is caused by the vibration. However, since the first and the second diaphragms 87a and 87b cannot be completely made equal to each other in dimensions, form, piezoelectric resistor constant and so forth in manufacturing them, the outputs $V_{B101}$ and $V_{B102}$ from the first and the second bridge circuits 101 and 102 are not equal to each other but nearly equal to each other. Besides, the amplification factors of the first and the second differential amplifiers 103 and 104 cannot be equalized to each other. Nevertheless, the differential output from the variable differential amplifier 105 can be made zero by adjusting the gain of the amplifier, even if the inputs thereto are not equal to each other. If the output from the first differential amplifier 103 is higher than that from the second differential amplifier 104, the gain of the variable differential amplifier 105 at the input terminal thereof for the output from the second differential amplifier is increased by adjusting the gain control resistor 112, to make the differential output from the variable differential amplifier zero. If the output from the first differential amplifier 103 is lower than that from the second differential amplifier 104, the gain of the variable differential amplifier 105 at the input terminal thereof for the output from the first differential amplifier is increased by adjusting the gain control resistor 111, to make the differential output from the variable differential amplifier zero. For these purposes, the vortex pressure detector 8 is vibrated by a prescribed force, and the gain control resistors 111 and 112 are adjusted to make the differential output from the variable differential amplifier 105 zero, before the vortex flow meter is put into practical use.

As described above, according to the present device, a first and a second diaphragms are provided between a first and a second pressure chambers and between a third and a fourth pressure chambers, respectively, in a vortex flow meter so that the diaphragms cumulatively act for the detection of the pressure of Kárman vortices but differentially act against an external force such as a vibratory force. Besides, the amplification factors of a first and a second variable amplifiers are preset so that outputs based on the external force acting to the first and the second diaphragms are equalized to each other. As a result, the meter's capability to detect the pressure of the Kárman vortices in a range of very low flow rate is enhanced, and the difference between the diaphragms and the irregularity of the control section of the vortex flow meter are prevented from being harmful, to make the meter very reliable against the external force.

Further, according to the present device, a first diaphragm divides a first and a second pressure chambers from each other, and a second diaphragm divides a third and a fourth diaphragms from each other, so that the first and the second diaphragms cumulatively act for the detection of the pressure of Kárman vortices but differentially act against an external force such as a vibratory force. Besides, the gains for the inputs from bridge circuits, which respond to the strains of the diaphragm under the external force, can be preset to equalize the inputs to each other. As a result, the sensitivity to detect the pressure of the Kárman vortices in a range of very low flow rate is enhanced, and noise is prevented from being caused by the diaphragms under the external force or by the irregularity of circuit properties.

What is claimed is:
1. A vortex flow meter, comprising:
   a vortex generator provided in a conduit through which a fluid to be measured flows;
   first and second pressure takeout ports for picking up the pressure of Karman vortices generated in the fluid downstream of said vortex generator in said conduit;

first, second, third and fourth pressure chambers;

a first pressure passage for transmitting a first pressure change caused at said first pressure takeout port to said first and fourth pressure chambers;

a second pressure passage for transmitting a second pressure change caused at said second pressure takeout port to said second and third pressure chambers;

a first diaphragm provided between said first and second pressure chambers for detecting the difference in the pressure of said karman vortices;

a second diaphragm provided between said third and fourth pressure chambers for detecting the difference in the pressure thereof;

first and second bridge circuits for generating an output in response to the action of said first and second diaphragms, respectively;

first and second variable amplifiers for receiving the output from said first and second bridge circuits;

a differential amplifier for differentially amplifying the outputs from said first and second variable amplifiers, inverse each other to in polarity and nearly equal to each other in magnitude to generate an output representing the period of a pulsation which takes place along with the generation of said vortices; and first and second adjusting resistors provided in said first and second variable amplifiers for adjusting the amplification factors of said first and second variable amplifiers, respectively, to equalize the outputs from said first and second variable amplifiers to each other.

2. A vortex flow meter as claimed in claim 1, further comprising a wave-shaping circuit for wave-shaping the output from said differential amplifier.

3. A vortex flow meter, comprising:

a vortex generator provided in a conduit through which a fluid to be measured flows;

first and second pressure takeout ports for picking up the pressure of Karman vortices generated in the fluid downstream of said vortex generator in said conduit;

first, second, third and fourth pressure chambers;

a first pressure passage for transmitting a first pressure change caused at said first pressure takeout port to said first and fourth pressure chambers;

a second pressure passage for transmitting a second pressure change caused at said second pressure takeout port to said second and third pressure chambers;

a first diaphragm provided between said first and second pressure chambers for detecting the difference in the pressure of said Karman vortices;

a second diaphragm provided between said third and fourth pressure chambers for detecting the difference in the pressure thereof;

first and second bridge circuits for generating output signals in response to the action of said first and second diaphragm, respectively; and a variable differential amplifying circuit for differentially amplifying the outputs from said first and second bridge circuits, said variable differential amplifying circuit having gain adjusting means for performing gain adjustment to equalize the outputs from said first and second bridge circuits to each other even if a force except the vortex pressure is applied to said first and second diaphragm.

4. A vortex flow meter as claimed in claim 3 wherein said gain adjusting means comprises gain adjusting resistors.

* * * * *